Jan. 17, 1956 J. PAVELKA 2,731,616
WIRE CONNECTOR
Filed Feb. 9, 1953

INVENTOR.
Joseph Pavelka
BY Rodney Bedell
Atty.

United States Patent Office 2,731,616
Patented Jan. 17, 1956

2,731,616

WIRE CONNECTOR

Joseph Pavelka, St. Louis, Mo., assignor to Joseph Pavelka, Jr., St. Louis, Mo.

Application February 9, 1953, Serial No. 335,810

8 Claims. (Cl. 339—249)

The invention relates to wire connectors, such as are commonly used for attaching a tap line to a power line and usually comprising a split shank bolt with a clamping nut threaded on the shank and carrying a relatively rotatable washer or other pressure member slidable on the shank for exerting pressure on the connected wires.

One object of the invention is to facilitate the attachment of the tap wire to the connector bolt to prevent its disassembly therefrom prior to the application of the connector bolt and tap wire to the power line. This object is attained by the provision of apertured elements on the pressure member or its equivalent which will retain the tap wire irrespective of its being clamped against the power line.

Another object is to effect a positive and permanent engagement between the bolt shank and nut or other clamping element which is not subject to loosening of the clamping element on the threads because of yielding of the shank legs transversely of the bolt axis. This object is attained by threading the shank legs internally, surrounding the shank with a sleeve, and inserting a clamping element between the legs. This resists flexing of the legs transversely of the bolt and forces the opposing threaded surfaces into tight contact with each other.

Another object is to decrease the likelihood of the connector bolt being loosened or removed from the power line by unauthorized persons and this object is attained by substituting an "Allen" type socket screw, enclosed by the bolt shank, in place of the usual exterior nut readily engageable by a wrench or by ordinary pliers.

Another object is to avoid the necessity of forming a hexagon or other polygonal head on a base of round stock material in order to provide a wrench-engaging surface on the bolt. A similar object is to avoid the necessity of forming a round shank, for external threads, from hexagonal stock. These objects are attained by utilizing hexagon or other polygonal bar stock which may be done since, with internal threads, the external contour of the stock in cross section is immaterial. With this arrangement any part of the bolt or of a similarly shaped sleeve-like member receiving the bolt, may be engaged by a wrench during tightening of the clamping element.

These and other detailed objects of the invention are attained by the structure illustrated in the accompanying drawings, in which.

Each of Figures 1–4 shows the power line and a single tap line associated with the bolt.

Figures 5, 6, 7:
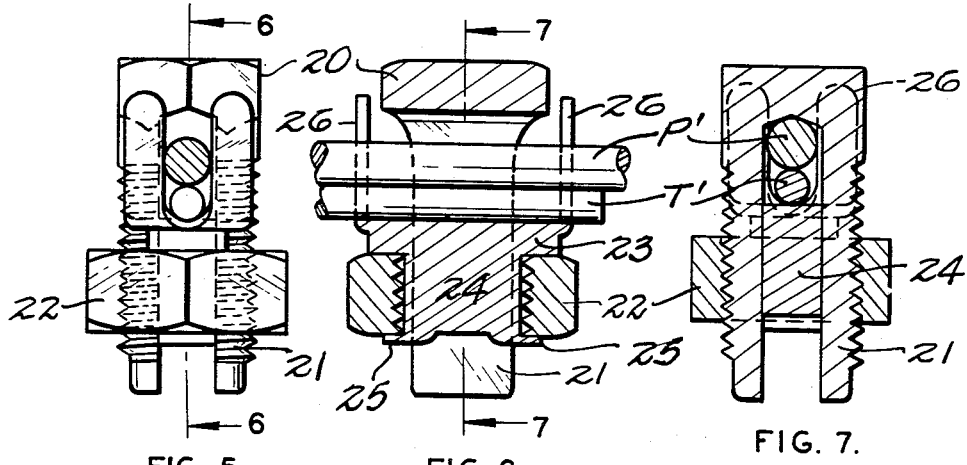
Figures 1, 2, 3:
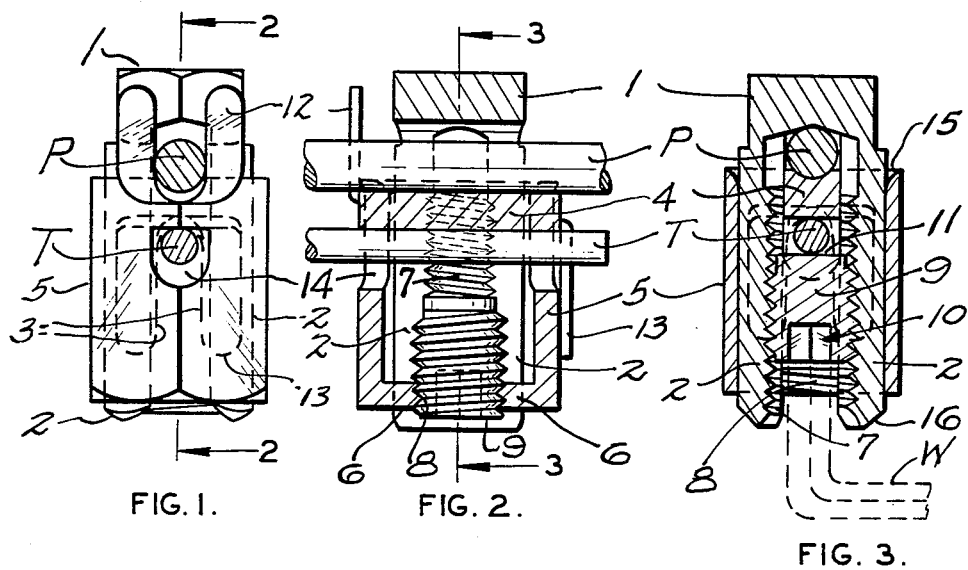
Figure 1 is a side view of a split shank connector bolt, a clamping sleeve washer associated therewith, and a clamping screw threaded into the shank between its legs.
Figure 2 is a section longitudinally of the bolt taken on the line 2—2 of Figure 1.
Figure 3 is a section longitudinally of the bolt taken on the line 3—3 of Figure 2.
Figure 4:
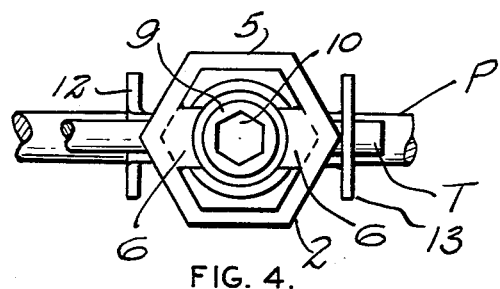
Figure 4 is a top view of the bolt shown in Figures 1–3.

Figure 5 corresponds to Figure 1 but shows a more familiar type of bolt but with the tap line holding feature included in the clamping washer or pressure bar.

Figure 6 is a longitudinal section taken on the line 6—6 of Figure 5.

Figure 7 is a longitudinal section taken on the line 7—7 of Figure 6.

In the structure illustrated in Figures 1–4, the bolt has a hexagonal or other desired polygonal exterior contour and may be formed from a similarly shaped bar or from flat stock bent into U section and swaged to provide the hexagonal shape. The bolt has a closed end 1 and its shank portion is split substantially throughout its length to form spaced legs 2, the opposing edges 3 of which are spaced apart to freely receive between them a plurality of wires such as indicated at P and T representing, respectively, a power line and a tap wire and also to freely receive the cross bar 4 of a pressure or washer member forming part of a sleeve 5, adapted to surround the bolt shank and having a corresponding hexagonal contour in cross section. Sleeve 5, with cross bar 4, is slidable lengthwise of the bolt and has inturned lugs 6 at its lower end spaced from cross bar 4 and similarly slidable in the space between opposed spaced edges 3 of legs 2.

Legs 2 have internal threads 7 and the inner ends of lugs 6 may be similarly threaded at 8. An "Allen" screw 9, having an angular socket 10, engages threads 7, 8 and may be rotated by wrench W to advance the screw along the bolt shank until the upper end or clamping face 11 of the screw engages wire T. About this time the screw will ride out of the threads in lugs 6 and will move wire T and pressure bar 4 and wire P and thrust the latter against the closed end of the bolt. Further rotation of the screw will increase the clamping pressure but cannot spread legs 2, which are surrounded by sleeve 5.

Screw 9 may be tightened or loosened in the bolt repeatedly but will be retained by lugs 6 against removal from sleeve 5 unless the screw is intentionally unthreaded through lugs 6. There would be no object in such removal of the screw during normal use of the connector.

Lugs 6 could remain unthreaded and merely be bent to the position shown after screw 9 had been inserted in the threaded bolt. In this case, the screw could only be removed from the bolt by again bending lugs 6 outwardly to free the bolt.

Preferably the member forming the sleeve and pressure bar is provided with a pair of ears 12 externally of sleeve 5 and extending upwardly therefrom and spaced apart to receive wire P between them. A similar pair of ears 13 extends downwardly from a diametrical opposite side of member 4 and receive wire T between them. Ears 12 and 13 of each pair are readily bendable manually towards each other to engage wires P and T and maintain the assembly of the wires with sleeve 5 pending advancement of screw 9 into engagement with the bolt shank threads. Sleeve 5 is apertured at 14 to accommodate the passage of wire T through the connector. If desired, more than one tap wire may be assembled with the sleeve by either pair of ears.

The inner periphery of sleeve 5 is flared outwardly at its upper end as indicated at 15 to facilitate the entry of the terminals of shank legs 2, which are chamfered at 16 for the same purpose.

When the wires have been clamped to the bolt as indicated in Figure 3, screw 9 is out of sight or, if more wires are present in the connector, is at least flush with the end of the bolt and not readily rotatable by a pair of pliers as might be attempted by an unauthorized person tampering with the connection.

Figures 5, 6, and 7 illustrate another form of the invention embodying the wire-holding ear feature but not including the inside threading of the shank legs. In this structure, the bolt resembles the usual connector bolt having a head 20, a split shank forming legs 21, which are threaded externally to be received in a nut 22, which is provided with a washer 23, including a pressure bar 24, extending between the shank legs and having lugs 25 at its lower end engaging the lower face of nut 22. The washer is slidable lengthwise of the bolt, by the rotation of nut 22, to clamp wires P' and T' to each other. Washer 23 is provided with a pair of ears 26 at opposite sides of the bolt. Both pairs of ears are shown as extending in the same direction from the washer with the ears of each pair receiving between them the wires to be clamped together. The ears may extend in opposite directions as indicated in Figures 1-3.

In both forms of the invention, the workman may secure the wires to the connector before tightening the clamping element. The tap wire alone may be easily secured to the connector by wrapping it around the sleeve and if this is all that is necessary the ears may be omitted. This arrangement avoids manually holding the wires to the connector while the clamping member is tightened. This is particularly advantageous when the connector and tap wire are to be applied to an overhead line by means of a tool mounted on a pole, as illustrated in an application for such a tool, filed by the present inventor January 8, 1953, Serial No. 330,241.

The details of the structure may be varied other than as indicated without departing from the spirit of the invention and the exclusive use of those modifications coming within the scope of the claims is contemplated.

What is claimed is:

1. A wire connector comprising a bolt member with a split shank, a member threaded to said shank, and a pressure member between the spaced legs of the split shank slidable lengthwise of said shank, there being opposing clamping faces on said bolt member and pressure member, and a pair of bendable ears projecting outwardly of said shank from said pressure member and spaced apart to receive a wire between them.

2. In a wire connector, a bolt having a closed end and a split shank extending therefrom and forming spaced legs with internal threads, an elongated sleeve-like member slidably receiving said shank, and a part receivable in said shank and threaded externally to engage said threads and having a clamping face opposing the bolt closed end, the end of the sleeve remote from the bolt head being provided with lugs, extending into the spaces between the shank legs, and the ends of said lugs being threaded similarly to the leg threads.

3. A wire connector as described in claim 2 in which one end of the sleeve has its inner periphery flared outwardly to form a guide for the ends of the bolt legs when inserted into the sleeve.

4. A wire connector as described in claim 2 in which the externally threaded part comprises an "Allen" screw with a socket opening outwardly towards the end of the bolt.

5. A wire connector, a bolt having a head and split shank, said shank having internal threads, a member slidable longitudinally of said shank and provided with means externally of and at opposite sides of said shank for receiving a wire extending transversely through the shank, said means at each side of the shank comprising a pair of spaced ears extending longitudinally of the bolt shank and parallel to the external side face of the member, the ears of each pair being bendable towards each other to engage a wire and hold it assembled with the member, and a threaded part engaged with said shank threads to move said member lengthwise of the shank when rotated relative thereto.

6. A wire connector comprising a bolt member with a split shank, a nut threaded on said shank, and a pressure member slidable lengthwise of said shank member, there being opposing clamping faces on said members, and pairs of ears at diametrically opposite sides of said pressure member externally of said shank, the ears of each pair being spaced from each other to receive a wire between them and being bendable towards each other to secure a wire in assembled relation with the member, one pair of ears extending from the pressure member towards one end of the bolt and the other pair of ears extending from the pressure member towards the other end of the bolt.

7. In a wire connector, a bolt comprising a head member and a split shank projecting therefrom, a pressure member slidable lengthwise of said shank, there being opposing clamping faces on said members, a part threaded to said shank for moving said pressure member relative to said head member to bring said opposed clamping faces toward each other, and pairs of ears on said pressure member at diametrically opposite sides thereof and positioned externally of said shank, the ears of each pair being spaced from each other to freely receive a wire between them and being readily bendable toward each other to thereby secure a wire between them in assembled relation with the pressure member irrespective of the position of said part.

8. In a wire connector, a bolt comprising a head member and a split shank projecting therefrom, a pressure member slidable lengthwise of said shank, there being opposing clamping faces on said members, a part threaded to said shank for moving said pressure member relative to said head member to bring said opposed clamping faces toward each other, and bendable elements on at least one of said members and movable independently of the relative position of said members for gripping a wire during relative movement of said members.

References Cited in the file of this patent

UNITED STATES PATENTS

| | | |
|---|---|---|
| 1,993,100 | Hoffman | Mar. 5, 1935 |
| 2,006,794 | Davidson | July 2, 1935 |
| 2,088,414 | Heinrich | July 27, 1937 |
| 2,187,166 | Madden | Jan. 16, 1940 |
| 2,542,084 | Hrach | Feb. 20, 1951 |
| 2,635,312 | McCullough | Apr. 21, 1953 |